CASEIN PRECIPITATED AT 10° C.

CASEIN PRECIPITATED AT 37° C.

Aug. 15, 1950        J. A. REYNIERS            2,518,493
            PROCESS FOR PREPARING CASEIN
Filed April 14, 1949                    3 Sheets-Sheet 3

RATS BORN NATURALLY AND SUCKLED ON MOTHER

CAESAREAN BORN RATS HAND FED A DIET CONTAINING STANDARD CASEIN

CAESAREAN BORN RATS HAND FED THE SAME DIET CONTAINING PRODUCT OF THIS INVENTION

James A. Reyniers

Patented Aug. 15, 1950

2,518,493

UNITED STATES PATENT OFFICE 2,518,493

PROCESS FOR PREPARING CASEIN

James A. Reyniers, Niles, Mich., assignor to Amino Acids, Inc., Wilmington, Del., a corporation of Delaware Application April 14, 1949, Serial No. 87,396

2 Claims. (Cl. 260—120)

This invention relates to the production of a highly nutritious protein product from milk and is a continuation in part of the copending application of James A. Reyniers, Serial No. 27,030, filed May 14, 1948, now abandoned. Its object is twofold, namely to improve the nutritional value of casein and to provide a commercially economic and simple method of preparing the improved product.

Physically the product of this invention resembles the flocculated milk proteins in the stomachs of new born suckling young. Examination of the stomach contents of suckling rats shows the casein of the swallowed milk to be in a very fine flocculent condition substantially free of occluded lactose, mineral salts, and other proteins such as lactalbumin. These constituents of the milk are found in the fluid contents of the stomach.

When skim milk is treated according to this process, the casein is precipitated as a very fine floc containing little of the lactose, minerals or other proteins present in the milk. This protein floc is less altered than if prepared by methods heretofore in use and thus more nearly resembles the flocculated milk proteins in the stomachs of new born suckling young.

The fine flocculent quality of the casein of this invention, as compared to the coarse, grainy structure of so-called standard casein is shown by the comparison of Figures 1 and 2 of the accompanying drawings. These figures are reproductions of micro photographs taken, respectively, of a sample of the casein of this invention and a sample of the so-called standard casein.

Standard casein is precipitated at 37° C. whereas the casein of this invention is precipitated at a far lower temperature, preferably at about 10° C. The samples shown in the reproduction of the photographs were precipitated at these temperatures, as indicated on the legends in said views.

The temperature at which the acid is added and precipitation conducted is critical. It should not be less than 2° C. nor higher than 16° C. Temperatures as low as 5° C. are satisfactory, but if precipitation is conducted at temperatures below 5° C., the floc is so fine that it is difficult to handle; and at 2° C. and lower no precipitation takes place.

If the upper limit of 16° C. is exceeded the product does not have the desired fine flocculent quality but instead is lumpy and coarse. The criticality of the upper temperature limit is shown in Figure 3 of the accompanying drawings which shows a series of curves plotted to depict the difference in the rate of separation and settling of casein precipitated at different temperatures. These curves show that with casein precipitated at 16° C. it requires two and one-half (2½) hours to settle out thirty percent (30%) of the particles from the whey whereas with casein precipitated at 17° C. it requires only one hour to settle out thirty percent (30%) of the casein; and that with casein precipitated at 21° C. thirty percent (30%) of the casein settles out in about thirty-three (33) minutes. The so-called standard casein which is precipitated at 37° C. settles so fast that it is practically impossible to measure the rate of settling.

The physical difference of the casein of this invention over that heretofore available is probably the chief reason for its improved nutritional value. The nutritional value of the casin product of this invention is convincingly demonstrated in feeding experiments on suckling Caesarean born rats. By plotting the weights of the subjects in grams vs. time in days, the nutritional value of the product can be graphically shown as has been done by the curves illustrated in Figures 4, 5 and 6 of the accompanying drawings.

The feeding experiments represented by these curves show conclusively that the product of this invention is far superior in nutritional value to standard casein, and in effect approaches the efficacy of naturally suckled food.

One example of the method of this invention is as follows:

Skim milk is diluted with distilled water in a ratio of 1:3 and held at a constant temperature of 10° C. To six (6) quarts of diluted milk, 8 c. c. of concentrated hydrochloric acid diluted with 25 c. c. of water, and also cooled to 10° C. is added slowly at a rate of 25 c. c. in 30 minutes with constant agitation. This gives the mixture a pH of about 4.6. A floc forms on standing at 10° C. which is light and fine in texture.

The whey may be decanted from the floc and the latter filtered out on 300 mesh nylon. The floc is then washed with distilled water, and thereafter dried in any suitable manner as by spraying or under a vacuum. The resulting product is a pure white soft very fine floc containing little of the lactose, minerals or other proteins present in milk, and practically devoid of odor/or taste.

While the degree of dilution of the milk, the concentration of the acid, and the rate of its addition to the skim milk are not too critical and may be varied to an extent known to the art, the temperature at which the acid is added and precipitation effected is critical. As stated preferably it is done at 10° C. Definitely it should not be conducted at higher than 16° C. nor lower than 2° C.

Figure 1:
Figure 2:
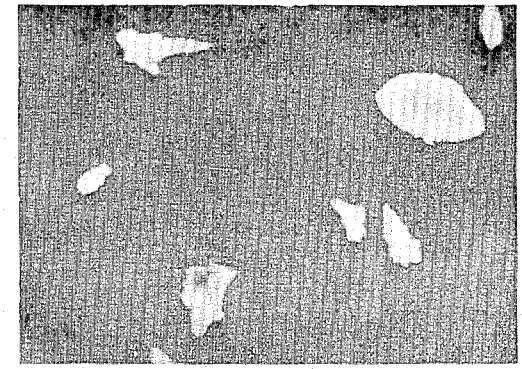
Figure 3:
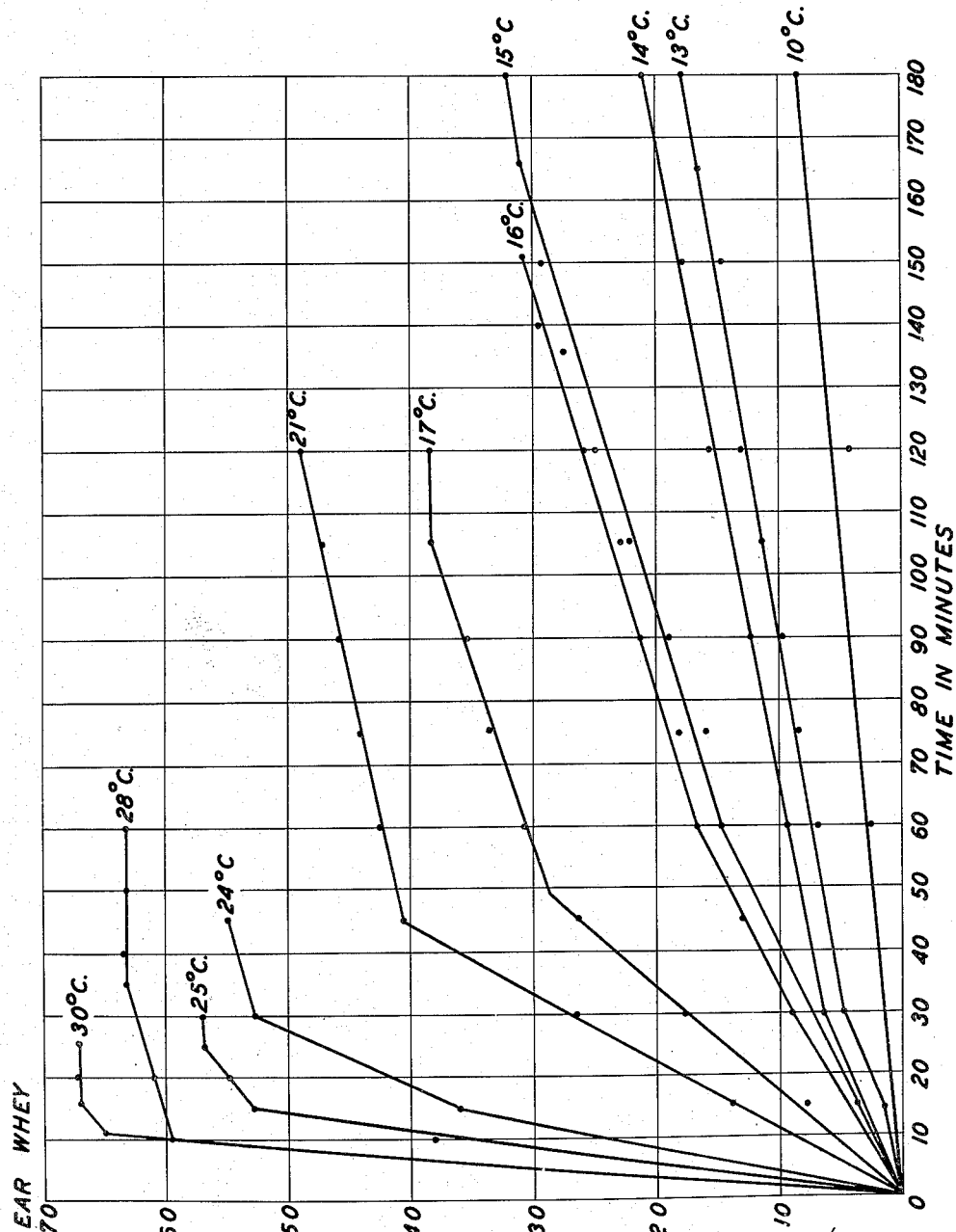
Figure 4:
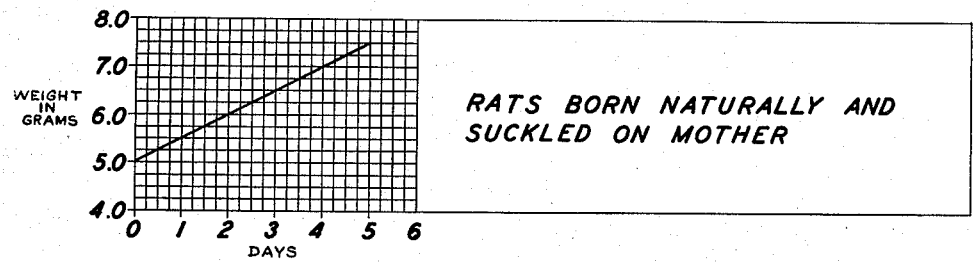
Figure 4 depicts the gain in weight of a natural born rat suckled on its mother.
Figure 5:
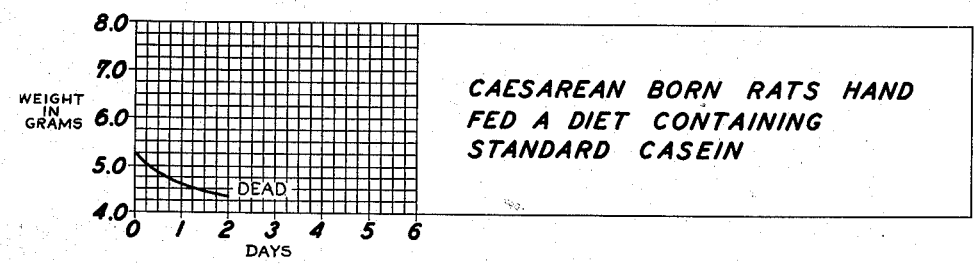
Figure 5 is a curve which depicts the rapid loss in weight and death of a Caesarean born rat fed a diet containing standard casein.
Figure 6:
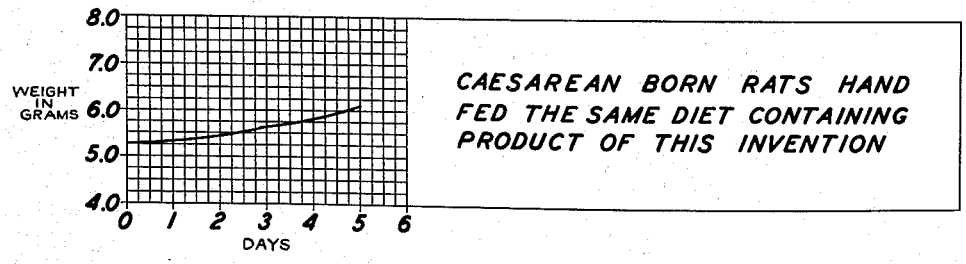
Figure 6 is a curve which depicts the gain in weight of a Caesarean born rat when fed the same diet used in the example depicted by Figure 5 but with the casin of this invention substituted for the standard casein.

In making the experiments depicted on the graph of Figure 3 a series of pasteurized skim milk samples and the acid of precipitation were adjusted to the different temperatures noted on the separate curves. The acid was added in the same manner to all of the various samples, keeping the rate of addition and stirring constant. The samples were then placed in sealed jars and allowed to stand undisturbed at room temperature. The amount of clear whey appearing above the precipitate was measured at time intervals, the percentage of clear whey calculated and then plotted on the graph.

At 16° C. the formation of a few small lumps was observed but in the samples precipitated above 16° C. there is a regular and rapid increase in both size and number of lumps. With precipitation conducted at 10° C. the resulting product is entirely free from lumps.

While hydrochloric acid yields by far the most nutritious product, sulfuric, phosphoric, lactic and acetic acids also yield products which are more nutritious than standard casein preparations, milk powders, condensed milk, or standard casein, i. e., the precipitate of undiluted milk and hydrochloric acid added rapidly at 34° or above.

From the foregoing description it will be readily apparent to those skilled in this art that the casein of this invention is definitely nutritionally superior to commercial caseins heretofore available, and that the method by which this improved casein is produced is entirely compatible with production methods of manufacture.

What I claim as my invention is:

1. A method of producing casein suitable for use as a food supplement, which comprises: precipitating skim milk by slowly adding a weak acid; agitating the mixture of skim milk and acid as the acid is added; controlling the temperature of the soution so as to hold the same below 16° C. and above 2° C. throughout the entire period of precipitation whereby a fine, flocculent precipitate is formed; separating the precipitate from the whey; washing the precipitate with distilled water; and drying the precipitate to a powder.

2. The method of producing casein set forth in claim 1 but wherein the temperature of the solution is maintained at approximately 10° C. throughout the entire period of precipitation.

JAMES A. REYNIERS.

REFERENCES CITED

The following references are of record in the file of this patent:

Rogers: "Fundamentals of Dairy Science," Reinhold Publ. Co. of New York, 2d Ed. (1935) pp. 57 to 60.

Sutermeister: "Casein and Its Industrial Applications," Reinhold Publishing Co. of New York, 2d Ed. (1939) pp. 20 and 24 to 31.